United States Patent
Yamazaki (10) Patent No.: US 12,351,231 B2
(45) Date of Patent: Jul. 8, 2025

(54) STEERING WHEEL

(71) Applicant: HONDA MOTOR CO., LTD., Tokyo (JP)

(72) Inventor: Ryo Yamazaki, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/536,315

(22) Filed: Dec. 12, 2023

(65) Prior Publication Data

US 2024/0208561 A1    Jun. 27, 2024

(30) Foreign Application Priority Data

Dec. 27, 2022  (JP) .................................. 2022-210138

(51) Int. Cl.
*B62D 1/04*      (2006.01)
*B62D 1/06*      (2006.01)
*B62D 1/08*      (2006.01)

(52) U.S. Cl.
CPC ....... *B62D 1/06* (2013.01); *B62D 1/08* (2013.01)

(58) Field of Classification Search
CPC .............. B62D 1/04; B62D 1/06; B62D 1/08
USPC ....................................................... D12/175
See application file for complete search history.

(56) References Cited

U.S. PATENT DOCUMENTS

| | | | | |
|---|---|---|---|---|
| 7,895,918 | B2 * | 3/2011 | Belsole .................... | B62D 1/06 74/552 |
| D737,184 | S * | 8/2015 | Oosuda ....................... | D12/175 |
| D787,994 | S * | 5/2017 | Carbone ..................... | D12/175 |
| 9,707,989 | B2 * | 7/2017 | Williams ................... | B62D 1/06 |
| D897,913 | S * | 10/2020 | Godard ....................... | D12/175 |
| D931,167 | S * | 9/2021 | Kim ............................ | D12/175 |
| 11,396,261 | B2 * | 7/2022 | Chiu ........................... | B62D 1/046 |
| 11,938,995 | B2 * | 3/2024 | Hada .......................... | B62D 1/06 |
| 2007/0137414 | A1 | 6/2007 | Belsole | |

(Continued)

FOREIGN PATENT DOCUMENTS

| | | | |
|---|---|---|---|
| CN | 114987597 A | * | 9/2022 |
| DE | 102017007841 | | 2/2019 |

(Continued)

OTHER PUBLICATIONS

Japanese Office Action for Japanese Patent Application No. 2022-210138 mailed Oct. 1, 2024.

*Primary Examiner* — Adam D Rogers
(74) *Attorney, Agent, or Firm* — Amin, Turocy & Watson, LLP (57) ABSTRACT

A steering wheel includes: a rim part having a non-annular shape; and a spoke part. In the rim part, a region that becomes an upper section in a steering neutral state is not continuous. The rim part includes a protrusion portion protruding toward an upper side in the steering neutral state from an intersection region intersecting the spoke part. The protrusion portion includes at least one of an inclination rear surface and an inclination front surface. The inclination rear surface is inclined to a vehicle rearward side toward an upper side in the steering neutral state from a surface facing the vehicle rearward side of the intersection region. The inclination front surface is inclined to a vehicle forward side toward an upper side in the steering neutral state from a surface facing the vehicle forward side of the intersection region.

15 Claims, 5 Drawing Sheets

(56) References Cited

U.S. PATENT DOCUMENTS

| | | |
|---|---|---|
| 2020/0172145 A1 | 6/2020 | Hirschfeld et al. |
| 2024/0208562 A1* | 6/2024 | Yamazaki ................ B62D 1/06 |
| 2024/0222048 A1 | 7/2024 | Ito et al. |

FOREIGN PATENT DOCUMENTS

| | | | | |
|---|---|---|---|---|
| JP | 2007-069717 | | 3/2007 | |
| JP | 2020-063016 | | 4/2020 | |
| KR | 20090123060 A | * | 12/2009 | |
| WO | WO-2021124678 A1 | * | 6/2021 | ............... B62D 1/06 |
| WO | 2022/230591 | | 11/2022 | |

* cited by examiner

STEERING WHEEL

CROSS-REFERENCE TO RELATED APPLICATION

Priority is claimed on Japanese Patent Application No. 2022-210138, filed on Dec. 27, 2022, the contents of which are incorporated herein by reference.

BACKGROUND

Field of the Invention

The present invention relates to a steering wheel of a vehicle.

Background

A steering wheel of a general vehicle includes a hub part supported by a steering shaft, a rim part having an annular shape to be gripped by a driver, and a spoke part connecting the hub part to the rim part. In recent years, steering wheels that include a rim part having a non-annular shape have been developed from the viewpoint of ensuring forward visibility or the like (for example, refer to Japanese Unexamined Patent Application, First Publication No. 2007-69717).

As a steering wheel of this type, a steering wheel is known in which the rim part is formed in a substantially semi-circular shape or a substantially semi-elliptical shape that is laterally elongated, and a region that becomes an upper section of the rim part is not present in a steering neutral state. In this steering wheel, the spoke part extends along a direction that becomes a vehicle width direction in the steering neutral state, and an end in the extension direction of the spoke part is connected to each of right and left upper end regions of the rim part.

In the case of this steering wheel, since a region (a portion arranged above the hub part) that becomes the upper section in the steering neutral state is not present in the rim part, the rim part does not block the sight of the driver looking forward, and forward visibility of the driver is ensured.

SUMMARY

However, in the steering device of the related art described above, when the driver grips an upper section of right and left side edges of the rim part in the steering neutral state, the spoke part is present at a position where the driver's thumb is placed, and therefore, in many cases, it is necessary for the driver to grip the spoke part at an unnatural finger position.

Further, in the steering device of the related art described above, the rim part is not present above an intersection region with the right and left spoke parts of the rim part in the steering neutral state. Therefore, when the driver grips the periphery of the intersection region with the right and left spoke parts of the rim part and performs a rotation operation of the rim part, the driver is forced to perform a careful rotation operation such that a position displacement of the gripped portion does not occur. That is, when the driver performs the rotation operation of the rim part, the hand of the driver who intends to push and rotate the rim part upward is easily displaced from an end of the rim part toward a direction of pushing and rotating, and the driver is forced to perform a careful rotation operation such that this displacement in the direction of pushing and rotating does not occur.

An aspect of the present invention provides a steering wheel that enables reasonable natural gripping of a rim part by a driver and a good rotation operation while ensuring good forward visibility of the driver in a steering neutral state. The aspect of the present invention further improves traffic safety and contributes to the development of a sustainable transport system.

A steering wheel according to an aspect of the present invention includes: a rim part having a non-annular shape in which a region that becomes an upper section in a steering neutral state is not continuous: and a spoke part extending along a direction that becomes a vehicle width direction in the steering neutral state and having an outer end in the vehicle width direction that is connected to the rim part, wherein the rim part includes a protrusion portion protruding toward an upper side in the steering neutral state from an intersection region intersecting the spoke part, and the protrusion portion includes at least one of: an inclination rear surface inclined to a vehicle rearward side toward an upper side in the steering neutral state from a surface facing the vehicle rearward side of the intersection region: and an inclination front surface inclined to a vehicle forward side toward an upper side in the steering neutral state from a surface facing the vehicle forward side of the intersection region.

When the steering wheel of the configuration described above is in the steering neutral state, the non-continuous section at the upper side of the rim part is located at a forward position of the sight of the driver. Therefore, the steering wheel does not block the forward sight of the driver, and the driver's visibility is improved.

Further, the driver can place the thumb of the hand to the inside of a base of the protrusion portion, and in that state, the driver can grip the intersection region with the spoke part of the rim part by a finger other than the thumb. Therefore, it becomes possible for the driver to stably grip the steering in a natural state that is not subject to an excessive force on the hand.

Further, when the driver grips the rim part as described above, the inclination rear surface or the inclination front surface of the protrusion portion is located just above the gripped portion. Therefore, in this state, when the driver rotates the rim part in one direction from the steering neutral state, the inclination rear surface or the inclination front surface of the protrusion portion becomes a resistance, and a hand at a side of pushing and rotating the rim part upward is not easily displaced in the rotation operation direction.

The rim part may include a lower extension portion extending from the intersection region to a lower side in the steering neutral state, and a rear surface facing the vehicle rearward side of the lower extension portion may be inclined to the vehicle rearward side toward a lower side in the steering neutral state from the surface facing the vehicle rearward side of the intersection region.

In this case, when the driver gripping the intersection region of the rim part rotates the rim part in one direction from the steering neutral state, the belly portion of the palm of the driver who intends to push and rotate the rim part upward is pushed against an inclination section of the rear surface of the lower extension portion in a state where the wrist is bent substantially at a right angle. Therefore, the driver can easily perform the rotation operation of the rim part in a state where the displacement of the gripped portion in the rotation operation direction is prevented.

In the protrusion portion, a width in the vehicle width direction in the steering neutral state may widen toward an end in a protrusion direction.

In this case, when the driver places the thumb to the inside of the base side of the protrusion portion and grips the intersection region with the spoke part of the rim part, in the steering neutral state, a side to which the width of the protrusion portion is increased is located at the upper side of the grip position of the driver. At this time, since the width of the base side of the protrusion portion is relatively narrow, the protrusion portion does not prevent gripping of the rim part by the driver. Further, since the width of the protrusion portion is increased toward the protrusion end side, when the driver performs the rotation operation of the steering wheel in a state where the driver grips the intersection region with the spoke part of the rim part, the position displacement of the gripped portion of the driver at a side of pushing and rotating the steering wheel upward can be further reliably prevented by the protrusion portion.

A surface facing upward in the steering neutral state of the protrusion portion may be a flat surface.

In this case, when the driver directly grips the protrusion portion, part of an index finger or a middle finger can be stably placed on the flat surface at the upper section of the protrusion portion. In this way, by placing part of the index finger or the middle finger on the flat surface at the upper section of the protrusion portion, placement of the finger on the protrusion portion is improved. Accordingly, when the present configuration is employed, the grip state when gripping the protrusion portion is stabilized.

A surface facing the vehicle rearward side of the protrusion portion and a surface facing the vehicle forward side of the protrusion portion may be inclined to an identical side in a vehicle forward-rearward direction toward a protrusion direction of the protrusion portion.

In this case, since the thickness in the vehicle forward-rearward direction of the protrusion portion is not too thick, even when the driver directly grips the protrusion portion, the ease of gripping is not compromised.

In the steering wheel according to an aspect of the present invention, the protrusion portion of the rim part includes at least one of the inclination rear surface and the inclination front surface. Therefore, when the steering wheel according to the aspect of the present invention is employed, it is possible to obtain reasonable natural gripping of the rim part by the driver and a good rotation operation while ensuring good forward visibility of the driver in the steering neutral state.

DESCRIPTION OF EMBODIMENTS

Hereinafter, embodiments of the present invention will be described with reference to the drawings.

In the embodiments described below, common parts are denoted by the same reference numerals, and redundant descriptions are partially omitted. Further, in appropriate positions in the drawings, an arrow FR that indicates a vehicle forward direction, an arrow UP that indicates a vehicle upward direction, and an arrow LH that indicates a vehicle leftward direction are shown.

<Steering Wheel Configuration>

Figure 1:
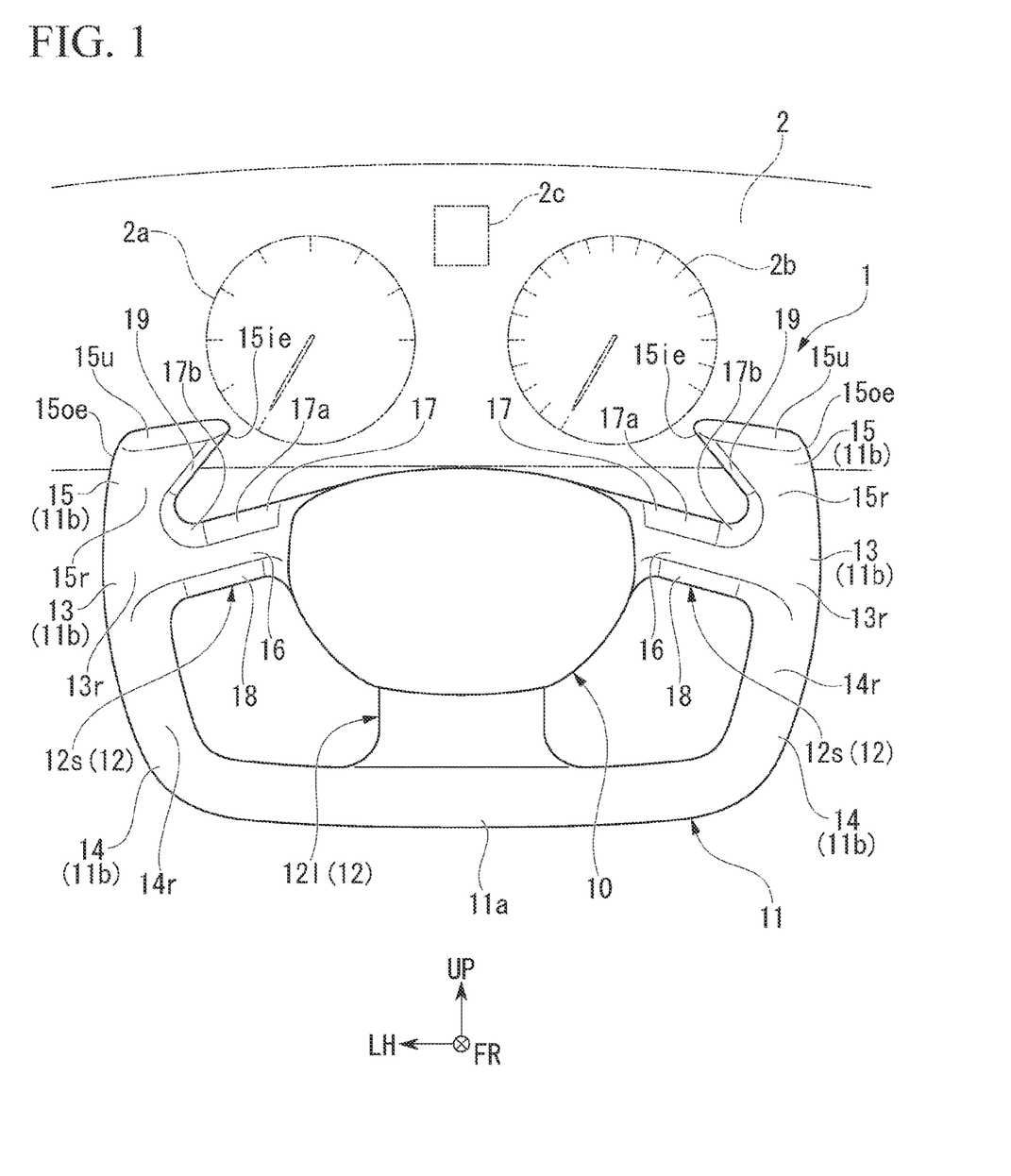
FIG. 1 is a front view of a steering wheel of an embodiment arranged in front of a driver's seat.
Figure 2:
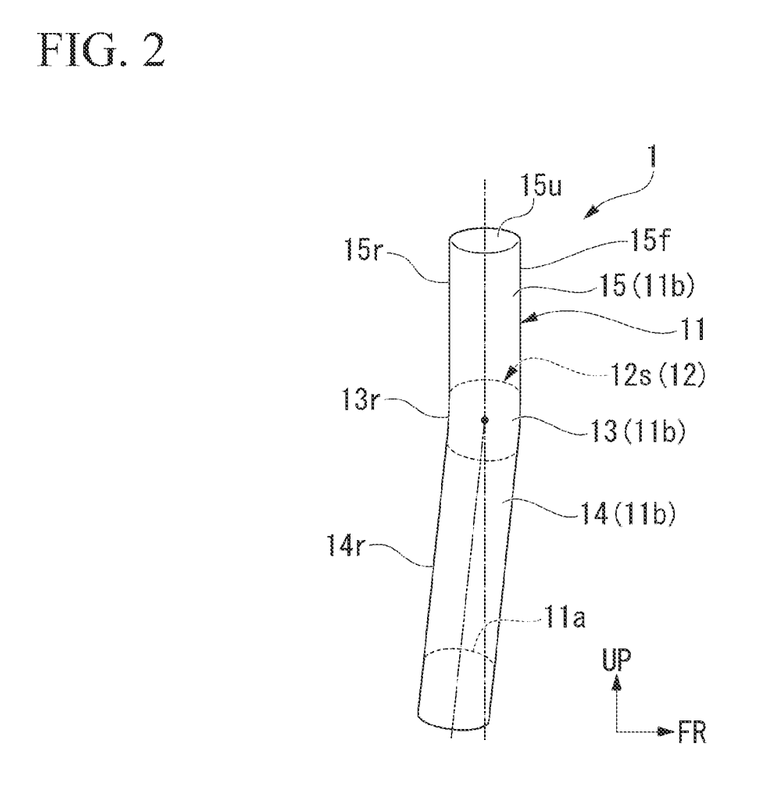
FIG. 2 is a side view corresponding to a II arrow of FIG. 1 of the steering wheel of the embodiment.

FIG. 1 is a front view of a steering wheel 1 of the present embodiment arranged in front of a driver's seat of a vehicle. FIG. 2 is a side view of the steering wheel 1 corresponding to a II arrow of FIG. 1.

The steering wheel 1 includes a hub part 10 supported by a steering shaft (not shown), a rim part 11 having a non-annular shape and gripped by a driver, and three spoke parts 12 connecting the hub part 10 to the rim part 11. An instrument panel 2 is arranged on a vehicle forward side of the steering wheel 1. Display portions 2a to 2c displaying vehicle information such as a vehicle speed and other information are arranged to face a direction of the driver (vehicle rearward side) on the instrument panel 2.

The hub part 10 is arranged so as to face the driver seated in the driver's seat. In the present embodiment, the hub part 10 is formed in a shape in which a front view is a substantially elliptical shape that is laterally elongated at the time of a steering neutral state. The hub part 10 includes a horn (not shown) and an air bag device (not shown).

The "steering neutral state" means a steering state (rotation position of the steering wheel 1) when a steering wheel of the vehicle is directed in a straight-running direction. Further, in the following description, the terms "upper", "lower", "vehicle width direction", and the like relating to the steering wheel 1 mean a direction when the steering wheel 1 is in the steering neutral state unless otherwise specified.

The rim part 11 has a non-annular shape in which a region that becomes an upper section in the steering neutral state is not continuous. The rim part 11 includes: a lower side portion 11a extending along the vehicle width direction below the hub part 10: and a pair of lateral side portions 11b extending upward from both ends in the vehicle width direction of the lower side portion 11a. An end on both sides of the lower side portion 11a is curved upward in an arc shape and continues to a lower end of each lateral side portion 11b.

The spoke part 12 includes: a pair of side spoke portions 12s extending along the vehicle width direction from the hub part 10 in the steering neutral state; and a lower spoke portion 121 extending downward from the hub part 10 in the steering neutral state. The side spoke portion 12s extends to be inclined slightly downward from a side end of the hub part 10 toward the outside in the vehicle width direction. An end in an extension direction of each side spoke portion 12s is connected to the lateral side portion 11b of the rim part 11.

Here, each lateral side portion 11b of the rim part 11 includes: an intersection region 13 intersecting an extension end of the side spoke portion 12s; a lower extension portion 14 extending downward from the intersection region 13 and having a lower end that is connected to the lower side portion 11a: and a protrusion portion 15 protruding upward from the intersection region 13. The detailed shape of the lateral side portion 11b will be described in detail later, but the overall shape of the lateral side portion 11b is formed substantially in an arc shape in a front view.

The intersection region 13 means a region sandwiched by an extension line of an upper side of the side spoke portion 12s and an extension line of a lower side of the side spoke portion 12s in each lateral side portion 11b of the rim part 11.

Further, each side spoke portion 12s includes: an inflection section 16 extending along an extension direction of the side spoke portion 12s and facing the driver's side (vehicle rearward side); an upper inclination surface 17 extending upward from the inflection section 16 and curved to a vehicle forward side; and a lower inclination surface 18 extending downward from the inflection section 16 and curved to the vehicle forward side. The inflection section 16 is a section that projects most to the driver's side (vehicle rearward side) in a cross-section that intersects the extension direction of the side spoke portion 12s. In the inflection section 16, the section that projects most to the driver's side (vehicle rearward side) extends along the extension direction of the side spoke portion 12s and continues to a rear surface 13r of the intersection region 13 of the rim part 11.

In the case of the present embodiment, the inflection section 16 has a band shape having a certain degree of vertical width. However, the inflection section 16 may have a line shape having little vertical width.

The upper inclination surface 17 of the side spoke portion 12s is set such that a radius of curvature of a portion curved to the vehicle forward side is larger than a radius of curvature of a portion curved to the vehicle forward side of the lower inclination surface 18. Further, the upper inclination surface 17 includes: a main region 17a extending linearly along the extension direction of the side spoke portion 12s in the front view; and a connection region 17b extending upward from an end on the rim part 11 side of the main region 17a to be curved in a recess form. In the main region 17a, a portion close to the inflection section 16 is curved to the vehicle forward side, but a further vehicle forward side than the curved portion is formed to be substantially flat. Further, the radius of curvature of a circular arc in the front view of the connection region 17b is gradually increased toward a front side from a back side in a depth direction (from the vehicle forward side to the rearward side).

In the protrusion portion 15 projecting upward from the intersection region 13 in each lateral side portion 11b of the rim part 11, the width in the vehicle width direction is gradually increased toward an end (upper end) in the protrusion direction. Specifically, an inner end portion 15ie which is an inner end in the vehicle width direction of the protrusion portion 15 is inclined substantially at a constant angle inward in the vehicle width direction from a connection with the intersection region 13 toward an upper side. That is, the inner end portion 15ie of the protrusion portion 15 expands inward in the vehicle width direction such that the expansion width is gradually increased toward the upper side.

Further, each rear surface 13r of the right and left intersection regions 13 of the rim part 11 is formed to be substantially flush with a rear surface of the inflection section 16 of the adjacent spoke part 12. On the other hand, a rear surface 15r of the right and left protrusion portions 15 of the rim part 11 is inclined to the vehicle rearward side from the rear surface 13r of the intersection region 13 toward an upper side as shown in FIG. 2. Further, a front surface 15f of the right and left protrusion portions 15 of the rim part 11 is inclined at substantially the same angle and to the same side as the rear surface 15r.

In the present embodiment, the inclined rear surface 15r of the protrusion portion 15 constitutes an inclination rear surface inclined to the vehicle rearward side toward an upper side from the rear surface 13r of the intersection region 13.

Further, each protrusion portion 15 protrudes upward from a position adjacent to the connection region 17b of the upper inclination surface 17 of the side spoke portion 12s. The connection region 17b of the upper inclination surface 17 is curved upward from an end on the rim part 11 side of the main region 17a of the upper inclination surface 17 and continues to the protrusion portion 15. Further, an upper end surface 15u (a surface facing upward in the steering neutral state) of each protrusion portion 15 is a substantially horizontal flat surface.

Figure 3:
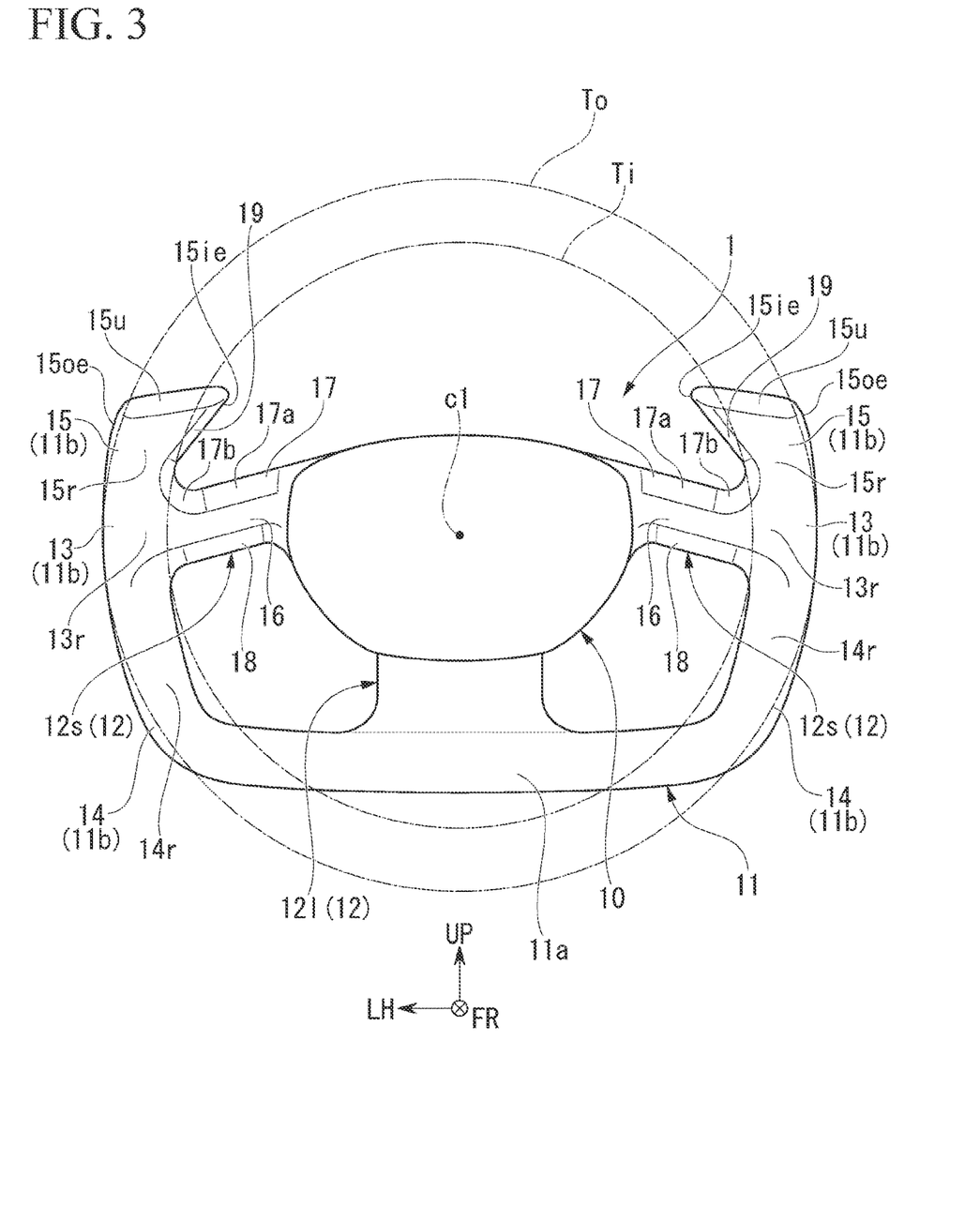
FIG. 3 is a front view of the steering wheel of the embodiment.

FIG. 3 is a front view of the steering wheel 1 in which a rotation trajectory To of an outer circumferential surface (an outer end surface in the vehicle width direction) of the intersection region 13 of the rim part 11 and a rotation trajectory Ti of an inner circumferential surface (an inner end surface in the vehicle width direction) of the intersection region 13 of the rim part 11 are added and indicated by a virtual line.

As shown in FIG. 3, part of an outer end portion 150e of the protrusion portion 15 protruding upward from each of the right and left intersection regions 13 projects further outward than the rotation trajectory To of the outer circumferential surface of the intersection region 13 of the rim part 11. Further, part of an inner end portion 15ie of the right and left protrusion portions 15 projects further inward than the rotation trajectory Ti of the inner circumferential surface of the intersection region 13 of the rim part 11.

Further, a flat inner inclination surface 19 facing inward in the vehicle width direction and to the driver's side (vehicle rearward side) is formed in an inner region in the vehicle width direction of each protrusion portion 15. The inner inclination surface 19 smoothly continues to an upper end of the curved connection region 17b in the upper inclination surface 17 of the side spoke portion 12s.

Further, a rear surface 14r of the lower extension portion 14 extending downward from the right and left intersection regions 13 is inclined to the vehicle rearward side from the rear surface 13r of the intersection region 13 toward a lower side.

<Gripping of Steering Wheel>

The driver seated in the driver's seat can grip the steering wheel 1 as follows.

(1) Grip Form 1

Figure 4:
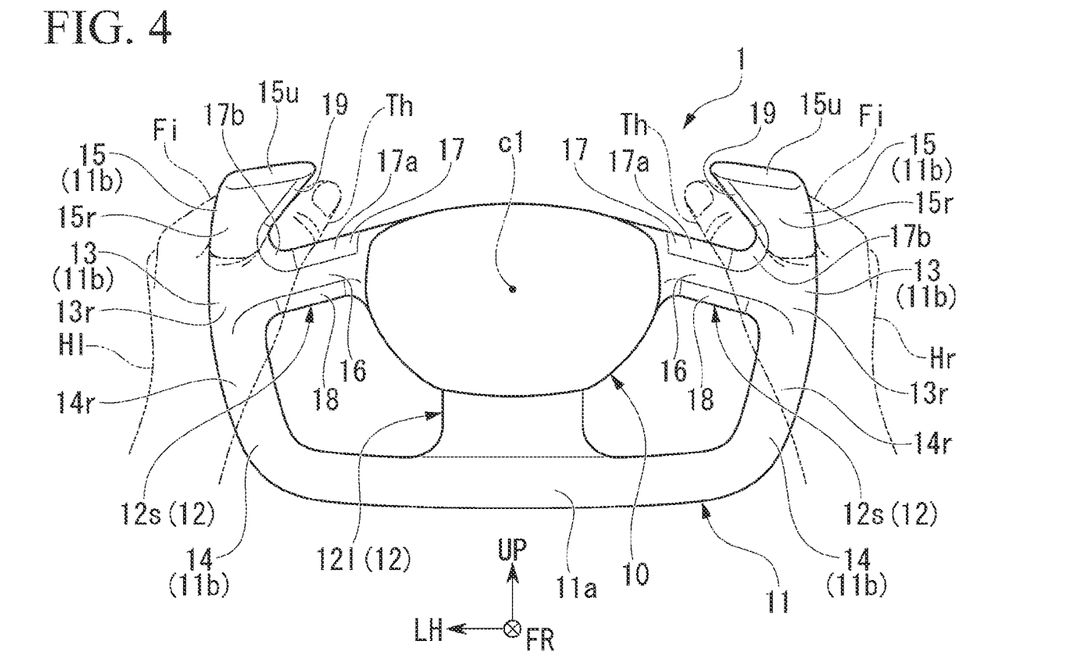
FIG. 4 is a front view showing a grip state of the steering wheel of the embodiment.

FIG. 4 is a front view showing a state in which the driver grips the steering wheel 1 in a grip form 1. In the drawing, reference numerals Hl, Hr represent the left hand and the right hand of the driver, respectively. Reference numeral Th represents the thumb of the hand. Reference numeral Fi represents a finger other than the thumb Th such as an index finger or a middle finger.

In this grip form 1, the driver presses the vicinity of the first joint and the belly of the thumb Th of the right and left hands Hr, Hl against the main region 17a and the connection region 17b of the upper inclination surface 17 of the spoke part 12, and in that state, the driver grips the outside of the intersection region 13 of the rim part 11 using the remaining fingers F. At this time, the thumb Th of the right and left hands Hr, Hl is oriented upward in a state of being inclined inward in the vehicle width direction, and the inner surface of the thumb Th is in contact with the connection region 17b of the upper inclination surface 17. Further, at this time, a root region between the thumb Th and the index finger of the right and left hands Hr, Hl is in contact with a lower region of the inclined rear surface 15r of the protrusion portion 15. Therefore, the hands Hr, Hl of the driver are not easily displaced upward, and gripping of the rim part 11 becomes stable. Further, at this time, the fingers Fi other than the thumb Th of the right and left hands Hr, Hl of the driver grip the intersection region 13 just below the protrusion portion 15.

(2) Grip Form 2

Figure 5:
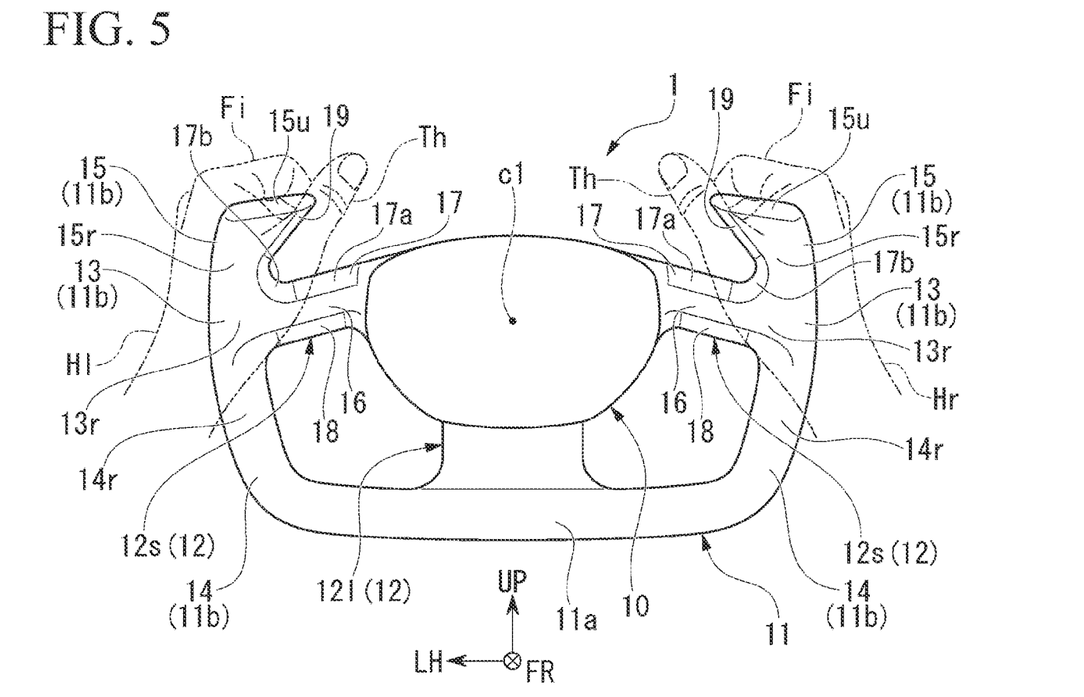
FIG. 5 is a front view showing another grip state of the steering wheel of the embodiment.

FIG. 5 is a front view showing a state in which the driver grips the steering wheel 1 in a grip form 2.

In this grip form 2, the driver directly grips the outer circumferential surface of the right and left protrusion portions 15 by the thumb Th and the fingers Fi other than the thumb Th of right and left hands Hr, Hl. At this time, the driver can hold the flat inner inclination surface 19 by the belly and the root of the thumb Th of the right and left hands Hr, Hl. Further, at this time, part of the index finger and the middle finger of the right and left hands Hr, Hl can also be placed on the flat upper end surface 15u of the right and left protrusion portions 15. Part of the vicinity of the root of the thumb Th of the right and left hands Hr, Hl can also be placed on the main region 17a or the connection region 17b of the upper inclination surface 17 of the spoke part 12.

In this grip form 2, since the rear surface 15r and the front surface 15f of the protrusion portion 15 are inclined rearward toward an upper side (protrusion end side), the driver can grip the protrusion portion 15 in a further natural grip attitude (grip attitude that is not subject to an excessive force on the hand).

Effects of Embodiment

As described above, in the steering wheel 1 of the present embodiment, a region of the rim part 11 that becomes an upper section in the steering neutral state is not continuous. Therefore, the rim part 11 does not block the forward sight of the driver. Accordingly, when the steering wheel 1 of the present embodiment is employed, the driver can view the display portions 2a to 2c on the instrument panel 2 and the forward direction outside the vehicle well.

Further, in the steering wheel 1 of the present embodiment, the driver can place the thumb Th of the hands Hr, Hl to the inside of the base of the protrusion portion 15, and in that state, the driver can grip the intersection region 13 of the rim part 11 by a finger Fi other than the thumb Th. Therefore, it becomes possible for the driver to stably grip the steering wheel 1 in a natural state that is not subject to an excessive force on the hands Hr, Hl.

Further, in the steering wheel 1 of the present embodiment, the rear surface 15r of the protrusion portion 15 protruding upward from the intersection region 13 of the rim part 11 is the inclination rear surface inclined to the vehicle rearward side toward an upper side. Therefore, when the driver grips the rim part 11, the rear surface 15r of the protrusion portion 15 inclined to the vehicle rearward side is located just above the gripped portion. Therefore, in this state, when the driver rotates the rim part 11, the inclined rear surface 15r of the protrusion portion 15 becomes a resistance, and the driver's hand Hr or Hl at a side of pushing and rotating the rim part 11 upward is not easily displaced in the rotation operation direction.

Accordingly, when the steering wheel 1 of the present embodiment is employed, it is possible to obtain reasonable natural gripping of the rim part 11 by the driver and a good rotation operation while ensuring good forward visibility of the driver in the steering neutral state.

Further, in the steering wheel 1 of the present embodiment, the rear surface 14r of the lower extension portion 14 of the rim part 11 is inclined to the rearward side toward a lower side. Therefore, when the driver gripping the intersection region 13 of the rim part 11 rotates the rim part 11 in one direction from the steering neutral state, the belly portion of the palm of the driver who intends to push and rotate the rim part 11 upward is pushed against an inclination section of the rear surface of the lower extension portion in a state where the wrist is bent substantially at a right angle.

Accordingly, when the steering wheel 1 of the present embodiment is employed, the driver can further easily perform the rotation operation of the rim part 11 in a state where the displacement of the gripped portion is prevented.

Further, in the steering wheel 1 of the present embodiment, the width in the vehicle width direction of the protrusion portion 15 widens toward an end (upper end) in a protrusion direction. Therefore, when a region of the thumb Th from the root to the vicinity of the first joint is pressed against the upper inclination surface 17 of the side spoke portion 12s, and in that state, an outer portion of the intersection region 13 of the rim part 11 is gripped by another finger, a side to which the width of the protrusion portion 15 is increased is located at the upper side of the other finger and the root of the thumb Th. At this time, since the width in the vehicle width direction of the base side of the protrusion portion 15 is relatively narrow, good gripping of the rim part 11 in a state where the thumb Th is pressed against the upper inclination surface 17 is not prevented. Further, since the width of the protrusion portion 15 is increased toward the protrusion end side (upper end side), when the driver performs the rotation operation of the steering wheel 1, the position displacement of the driver's hand at a side of pushing and rotating the steering wheel 1 upward can be further reliably prevented by the protrusion portion 15.

Further, in the steering wheel 1 of the present embodiment, the upper end surface 15u of the protrusion portion 15 is a flat surface. Therefore, when the driver directly grips the protrusion portion 15, part of the index finger or the middle finger can be stably placed on the flat upper end surface 15u of the protrusion portion 15. In this way, when part of the index finger or the middle finger is placed on the flat upper end surface 15u of the protrusion portion 15, placement of the finger on the protrusion portion 15 is improved.

Accordingly, when the steering wheel 1 of the present embodiment is employed, it is possible to stabilize the grip state when the protrusion portion 15 is directly gripped.

Further, in the steering wheel 1 of the present embodiment, the front surface 15f of the protrusion portion 15 is inclined to the vehicle rearward side toward the upper side similarly to the rear surface 15r side. Therefore, the thickness in the vehicle forward-rearward direction of the protrusion portion 15 is not too thick.

Accordingly, when the present configuration is employed, even when the driver directly grips the protrusion portion 15, the ease of gripping is not compromised.

Further, in the steering wheel 1 of the present embodiment, the side spoke portion 12s is inclined downward toward the outside in the vehicle width direction from a side end of the hub part 10. Therefore, when the driver grips the outer portion of the intersection region 13 of the rim part 11, the thumb Th can be naturally pressed against the upper inclination surface 17 (connection region 17b) of the side spoke portion 12s.

Further, even when the vertical width of the side spoke portion 12s is wide, the thumb Th can be placed at a height close to the height of a rotation center C1, and in that state, the rim part 11 can be stably gripped. Accordingly, when the present configuration is employed, a rotation operation performance of the steering wheel 1 can be maintained well.

Further, in the steering wheel 1 of the present embodiment, part (outer end portion 150e) of the outer circumferential surface of the protrusion portion 15 projects further outward than the rotation trajectory To of the outer circumferential surface of the intersection region 13 of the rim part 11. Therefore, when the driver grips the outer portion of the intersection region 13 of the rim part 11, the outer end portion 150e of the protrusion portion 15 projecting further outward than the rotation trajectory To of the outer circumferential surface of the intersection region 13 is located at the upper side of the finger (index finger) other than the thumb Th. Accordingly, when the driver performs the rotation operation of the steering wheel 1 in this state, the finger other than the thumb Th of the driver at a side of pushing and rotating the steering wheel 1 upward is caught by the outer end portion 150e of the protrusion portion 15, and displacement of the grip position of the driver is prevented.

Further, in the steering wheel 1 of the present embodiment, part (inner end portion 15ie) of the outer circumferential surface of the protrusion portion 15 projects further inward than the rotation trajectory Ti of the inner circumferential surface of the intersection region 13 of the rim part 11. Therefore, when the driver presses the thumb Th against the upper inclination surface 17 and grips the outer portion of the intersection region 13 of the rim part 11, the inner end portion 15ie of the protrusion portion 15 projecting further inward than the rotation trajectory Ti of the inner circumferential surface of the intersection region 13 is located at the upper side of the thumb Th. Accordingly, when the driver performs the rotation operation of the steering wheel 1 in this state, the thumb Th of the driver at a side of pushing and rotating the steering wheel 1 upward is caught by the inner end portion 15ie of the protrusion portion 15, and displacement of the grip position of the driver is prevented.

Similarly, even when the driver directly grips the protrusion portion 15 and performs the rotation operation of the steering wheel 1, the thumb Th of the driver at a side of pushing and rotating the steering wheel 1 upward is caught by the inner end portion 15ie of the protrusion portion 15, and displacement of the grip position of the driver is prevented.

Other Embodiment 1

Figure 6:
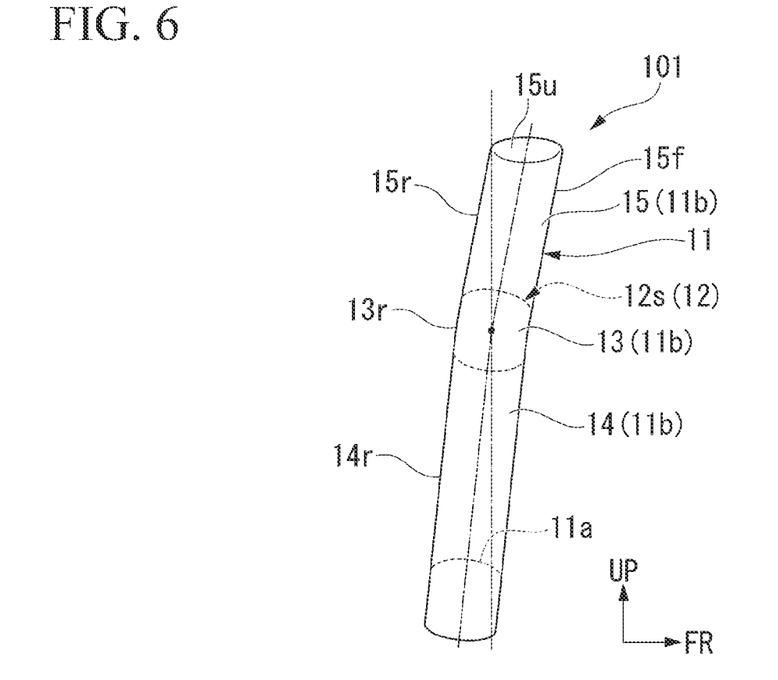
FIG. 6 is a side view of a steering wheel of another embodiment 1.

FIG. 6 is a side view of a steering wheel 101 of another embodiment 1.

In the steering wheel 101 of the present embodiment, the front surface 15f of the protrusion portion 15 protruding upward from the rim part 11 is an inclination front surface inclined to the vehicle forward side toward an upper side. The rear surface 15r of the protrusion portion 15 is inclined at substantially the same angle and to the same side as the front surface 15f. In the present embodiment, the inclined front surface 15f of the protrusion portion 15 constitutes an inclination front surface inclined to the vehicle forward side toward an upper side from the front surface 13f of the intersection region 13.

In the steering wheel 101 of the present embodiment, since the front surface 15f of the protrusion portion 15 is the inclination front surface inclined to the vehicle forward side toward an upper side, when the driver grips and rotates the rim part 11, the inclined front surface 15f of the protrusion portion 15 becomes a resistance, and the driver's hand at a side of pushing and rotating the rim part 11 upward is not easily displaced in the rotation operation direction.

Other Embodiment 2

Figure 7:
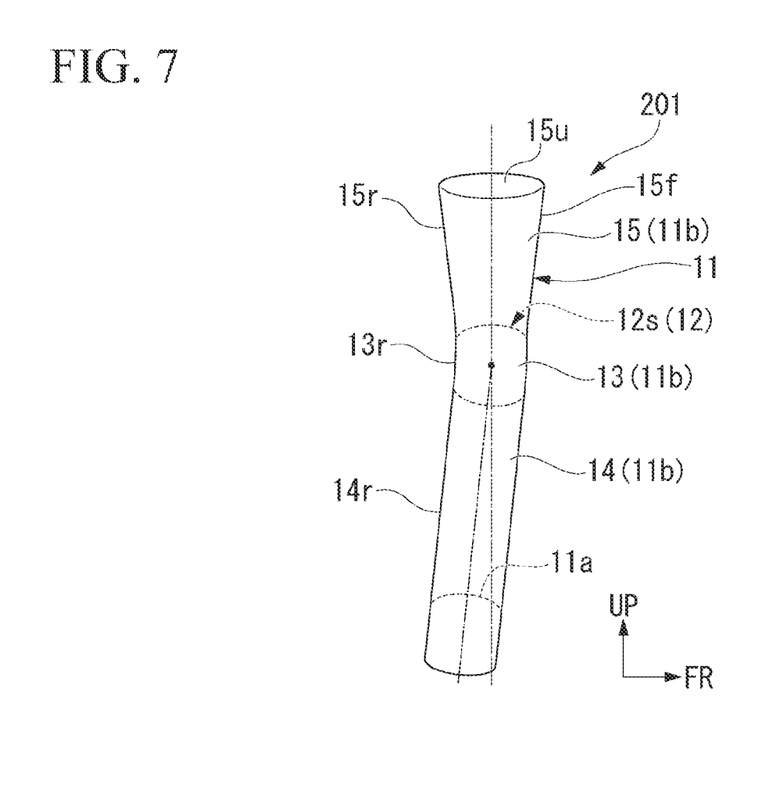
FIG. 7 is a side view of a steering wheel of another embodiment 2.

FIG. 7 is a side view of a steering wheel 201 of another embodiment 2.

In the steering wheel 201 of the present embodiment, the rear surface 15r of the protrusion portion 15 is an inclination rear surface inclined to the vehicle rearward side toward an upper side, and the front surface 15f of the protrusion portion 15 is an inclination front surface inclined to the vehicle forward side toward the upper side. The forward-rearward width of the protrusion portion 15 is gradually increased toward the upper side (protrusion end side) from a connection with the intersection region 13.

In the steering wheel 201 of the present embodiment, since the forward-rearward width of the protrusion portion 15 is gradually increased toward the upper side from the intersection region 13, when the driver grips and rotates the rim part 11, a section of the protrusion portion 15 having a gradually increased forward-rearward width becomes a resistance, and the driver's hand at a side of pushing and rotating the rim part 11 upward is not easily displaced in the rotation operation direction.

The present invention is not limited to the embodiments described above, and various design changes can be made without departing from the scope of the invention.

For example, in the above-described embodiment, the lower side of the rim part 11 below the right and left side spoke portions 12s is formed in a substantially U shape that is laterally elongated: however, the shape of the rim part 11 below the right and left side spoke portions 12s (below the intersection region) is not limited thereto. The shape of the rim part 11 below the right and left side spoke portions 12s may be, for example, a semi-circular shape or the like. Further, the rim part may have a shape without the lower side portion 11a.

Further, in the above-described embodiment, in addition to the right and left side spoke portions 12s, one lower spoke portion 121 is provided; however, the number and the shape of the lower spoke portion 121 is not limited to those of the above-described embodiments. Two or more lower spoke portions 121 may be provided, or the lower spoke portion 121 may not necessarily be provided.

What is claimed is:

1. A steering wheel comprising:
   a rim part having a non-annular shape in which a region that becomes an upper section in a steering neutral state is not continuous; and
   a spoke part extending along a direction that becomes a vehicle width direction in the steering neutral state and having an outer end in the vehicle width direction that is connected to the rim part,
   wherein the rim part comprises a protrusion portion protruding in a protrusion direction directed toward an upper side in the steering neutral state from an intersection region intersecting the spoke part,
   the protrusion portion includes an inclination rear surface inclined to a vehicle rearward side toward an upper side in the steering neutral state from a surface facing the vehicle rearward side of the intersection region, and
   in the protrusion portion, a width in the vehicle width direction in the steering neutral state widens toward an end in the protrusion direction.

2. The steering wheel according to claim 1,
   wherein the rim part comprises a lower extension portion extending from the intersection region to a lower side in the steering neutral state, and
   a rear surface facing the vehicle rearward side of the lower extension portion is inclined to the vehicle rearward side toward a lower side in the steering neutral state from the surface facing the vehicle rearward side of the intersection region.

3. The steering wheel according to claim 2,
wherein the inclination rear surface facing the vehicle rearward side of the protrusion portion and a surface facing the vehicle forward side of the protrusion portion are inclined to an identical side in a vehicle forward-rearward direction toward the protrusion direction of the protrusion portion.

4. The steering wheel according to claim 1,
wherein a surface facing upward in the steering neutral state of the protrusion portion is a flat surface.

5. The steering wheel according to claim 4,
wherein the inclination rear surface facing the vehicle rearward side of the protrusion portion and a surface facing the vehicle forward side of the protrusion portion are inclined to an identical side in a vehicle forward-rearward direction toward the protrusion direction of the protrusion portion.

6. The steering wheel according to claim 1,
wherein the inclination rear surface facing the vehicle rearward side of the protrusion portion and a surface facing the vehicle forward side of the protrusion portion are inclined to an identical side in a vehicle forward-rearward direction toward the protrusion direction of the protrusion portion.

7. A steering wheel comprising:
a rim part having a non-annular shape in which a region that becomes an upper section in a steering neutral state is not continuous; and
a spoke part extending along a direction that becomes a vehicle width direction in the steering neutral state and having an outer end in the vehicle width direction that is connected to the rim part,
wherein the rim part comprises a protrusion portion protruding in a protrusion direction directed toward an upper side in the steering neutral state from an intersection region intersecting the spoke part,
the protrusion portion includes an inclination front surface inclined to a vehicle forward side toward an upper side in the steering neutral state from a surface facing the vehicle forward side of the intersection region,
in the protrusion portion, a width in the vehicle width direction in the steering neutral state widens toward an end in the protrusion direction,
the rim part comprises a lower extension portion extending from the intersection region to a lower side in the steering neutral state, and
a rear surface facing the vehicle rearward side of the lower extension portion is inclined to the vehicle rearward side toward a lower side in the steering neutral state from the surface facing the vehicle rearward side of the intersection region.

8. The steering wheel according to claim 7,
wherein a surface facing upward in the steering neutral state of the protrusion portion is a flat surface.

9. The steering wheel according to claim 8,
wherein a surface facing the vehicle rearward side of the protrusion portion and the inclination front surface facing the vehicle forward side of the protrusion portion are inclined to an identical side in a vehicle forward-rearward direction toward the protrusion direction of the protrusion portion.

10. The steering wheel according to claim 7,
wherein a surface facing the vehicle rearward side of the protrusion portion and the inclination front surface facing the vehicle forward side of the protrusion portion are inclined to an identical side in a vehicle forward-rearward direction toward the protrusion direction of the protrusion portion.

11. The steering wheel according to claim 7,
wherein a surface facing the vehicle rearward side of the protrusion portion and the inclination front surface facing the vehicle forward side of the protrusion portion are inclined to an identical side in a vehicle forward-rearward direction toward the protrusion direction of the protrusion portion.

12. A steering wheel comprising:
a rim part having a non-annular shape in which a region that becomes an upper section in a steering neutral state is not continuous; and
a spoke part extending along a direction that becomes a vehicle width direction in the steering neutral state and having an outer end in the vehicle width direction that is connected to the rim part,
wherein the rim part comprises a protrusion portion protruding in a protrusion direction directed toward an upper side in the steering neutral state from an intersection region intersecting the spoke part, and
the protrusion portion includes: an inclination rear surface inclined to a vehicle rearward side toward an upper side in the steering neutral state from a surface facing the vehicle rearward side of the intersection region; and an inclination front surface inclined to a vehicle forward side toward an upper side in the steering neutral state from a surface facing the vehicle forward side of the intersection region.

13. The steering wheel according to claim 12,
wherein the rim part comprises a lower extension portion extending from the intersection region to a lower side in the steering neutral state, and
a rear surface facing the vehicle rearward side of the lower extension portion is inclined to the vehicle rearward side toward a lower side in the steering neutral state from the surface facing the vehicle rearward side of the intersection region.

14. The steering wheel according to claim 12,
wherein in the protrusion portion, a width in the vehicle width direction in the steering neutral state widens toward an end in the protrusion direction.

15. The steering wheel according to claim 12,
wherein a surface facing upward in the steering neutral state of the protrusion portion is a flat surface.

* * * * *